United States Patent [19]

Roquemore et al.

[11] Patent Number: 4,540,315

[45] Date of Patent: Sep. 10, 1985

[54] METHOD FOR EXPLORATORY TRENCH WALL STABILIZATION

[75] Inventors: Glenn R. Roquemore, Ridgecrest; Patrick E. Smith, Fresno, both of Calif.; Eric W. Banks, Salt Lake City, Utah

[73] Assignee: The United States of America as represented by the Secretary of the Navy, Washington, D.C.

[21] Appl. No.: 470,738

[22] Filed: Feb. 28, 1983

[51] Int. Cl.³ .................... E02D 3/12; C09K 17/00
[52] U.S. Cl. .................................................. 405/264
[58] Field of Search ............ 405/263, 264, 267, 268, 405/150, 282; 166/294, 295

[56] References Cited

U.S. PATENT DOCUMENTS

| | | | |
|---|---|---|---|
| 2,745,815 | 5/1956 | Mussell | 260/37 |
| 2,854,347 | 9/1960 | Booth et al. | 117/6 |
| 2,961,799 | 11/1960 | Coe | 47/9 |
| 3,077,054 | 2/1963 | Niemeijer | 47/9 |
| 3,174,942 | 3/1965 | Erikson et al. | 260/27 |
| 3,643,444 | 2/1972 | Hodgson | 405/264 |
| 3,651,649 | 3/1972 | Najvar et al. | 405/264 |
| 3,677,014 | 7/1972 | Stout et al. | 405/264 |
| 3,690,107 | 9/1972 | Dolfing et al. | 405/264 |
| 3,736,758 | 6/1973 | Dolfing | 405/264 |
| 3,763,072 | 10/1973 | Krieger | 260/29.6 S |
| 4,072,020 | 2/1978 | Bishop | 405/264 |
| 4,168,593 | 9/1979 | Jankowiak | 47/58 |
| 4,413,931 | 11/1983 | McDonald | 405/264 |

*Primary Examiner*—David H. Corbin
*Attorney, Agent, or Firm*—Robert F. Beers; W. Thom Skeer; Shelley G. Precivale

[57] ABSTRACT

Minor slides in a geologic exploratory trench are stabilized by applying a water diluted vinyl acetate-ethylene copolymer emulsion to the trench walls. Although the resulting emulsion and sand crust provides no structural support, it provides a surface cohesion which effectively stops all minor sliding and permits normal engineering logging to proceed.

3 Claims, No Drawings

METHOD FOR EXPLORATORY TRENCH WALL STABILIZATION

BACKGROUND OF THE INVENTION

1. Field of the Invention

This invention relates to a method of stabilizing trench walls. More particularly, this invention relates to a method of stablizing unconsolidated sand and gravel in a geologic exploratory trench wall.

2. Description of the Prior Art

Exploratory trenching is a process utilized in a wide variety of paliostratigraphy. While shoring is required to protect against major hazardous slumps, unconsolidated strata may allow minor slides which inhibit trench logging by the geologist. These small slides can result in the loss or misinterpretation of important information.

Soil stabilizers have been described for use in roadway construction (U.S. Pat. No. 4,072,020), erosion control (U.S. Pat. No. 4,168,593), and dust control in mine tailings (U.S. Pat. No. 3,667,014).

SUMMARY OF THE INVENTION

The present invention provides a method of stabilizing unconsolidated sand and gravel in a geologic exploratory trench by the application of a copolymer emulsion. The stablized soil halts minor sliding and preserves the trench wall during the logging.

OBJECTS OF THE INVENTION

It is an object of the invention to provide a method of stabilizing unconsolidated strata in an exploratory trenchwall.

Another object of the invention is to prevent minor slides in the trenchwall until logging is completed.

Other objects, advantages and novel features of the invention will become apparent from the following detailed description of the invention.

DESCRIPTION OF THE PREFERRED EMBODIMENT

In the present method, the emulsion can be a polymeric latex. Preferably the latex will mix with water, which is convenient for diluting the emulsion and for cleaning it from equipment. A non-toxic vinyl acetate-ethylene copolymer emulsion (Airflex glue, grade A-400, manufactured by Air Products and Chemicals, Inc.) has been found particularly suitable. This vinyl acetate-ethylene copolymer emulsion is white in its liquid form, but dries after application to a clear ductile state. It has a recommended shelf life of six months and must be stored at temperatures above 40° F. Under hot, dry conditions, this emulsion has a curing time of only a few hours when applied to the soil, but under cold, wet conditions the curing time can be extended indefinitely.

By using the vinyl acetate-ethylene emulsion, a clear emulsion-sand crust is obtained. This clear crust does not block the trench wall from view. The geologic logging would be blocked by an opaque or colored crust. The advantage of this latex emulsion over asphalt emulsions is the lack of visual effect and lack of alteration to the soil.

Several methods are available for emulsion application. For trench wall application sprinkler systems have been impractical because of solution runoff, erosion and gravity-induced sliding caused by the growing moisture weight. Two different pumps have successfully been used. The first was a trailer-mounted pump (Bean, 200-gallon tank) powered by a gasoline engine. It used a hose with an adjustable nozzle and operated at 35 psi. The second was a small (3-gallon tank), manually pressurized pump.

The emulsion was diluted with water to ranges between 5 and 10% emulsion concentration. It was found that each of the dilutions worked equally well following application on the trench wall. To conserve emulsion the 5% emulsion concentration proved most advantageous. The invention will be illustrated by the following nonlimiting examples.

EXAMPLE 1

An exploratory trench was excavated along a fault. The excavation was accomplished by a D-7 Caterpillar bulldozer and gave an initial trench approximately 4 meters wide, 3 to 5 meters deep and 35 meters long. The trench wall to be logged contained a variety of soil types, including several units of unconsolidated materials, mostly sand and gravel. Throughout the excavation procedure, the trench was plagued with minor sliding. The stratified material was so unconsolidated that debris fans began to coalesce in the bottom of the trench. All sliding observed was associated with faults.

The sliding actually consisted of small, upward migrating surface failures. These small, spontaneous failures were the reason for trench wall erosion. The activation of the small slides was started by vibrations from the bulldozer during the initial excavation, gravity, and by the wind, including even the slightest breezes.

To stabilize the trench walls, Airflex glue, a non-toxic vinyl acetate-ethylene copolymer emulsion was applied to the walls by spraying. The emulsion was diluted with water to an emulsion concentration of from 5 to 10 percent. The application of this emulsion mixtured formed an emulsion-sand crust ranging from 1.3 to 1.9 cm thick.

During the trench wall excavation a significant amount of caving and sliding occured from the vibrations of the bulldozer. To reduce this type of caving, a trailer-mounted pump was used in conjunction with the bulldozer to apply a dilute emulsion solution to the trench as the bulldozer made each pass. Nozzle adjustment was constantly controlled so that the emulsion solution did not gouge into the trench wall or cause additional sliding to occur. Although the emulsion did not set up immediately, moistening the trench wall during excavation effectively stopped most of the sliding created by the bulldozer.

EXAMPLE 2

After the initial stabilization of the trench wall, foot traffic near the base of the wall disturbed the bottommost layer of the crust. This disturbance initiated small slides at the base of the wall that quickly migrated up under the emulsion-sand crust. Underlying slides were stabilized as soon as they were detected by the use of the 3-gallon hand-held pump. Where older slides had migrated underneath the original emulsion-sand crust, the crust was dug away with a shovel and the areas was re-stabilized by spraying with the small pump.

The hand-held pump was very useful for stabilizing small exploratory excavations dug into the trench wall. Where observations of the trench wall were obscured, the solid emulsion-sand crust was removed with a shovel, and the geologic features of the small area were probed and investigated. Then, a new emulsion seal was applied using the 3-gallon pump. This cut and seal method proved to be very successful for tracing faults and stratified layers, and it was used extensively throughout the data logging procedure.

Using the small pump, a very thin emulsion-sand crusts ranging from 0.6 to 1.2 cm thick were generated. The thin crusts were as successful in stopping the sand from sliding as the thick crusts. They also had the advantages of not obscuring the wall with a dusty opaque cover, drying within 30 minutes, and being more economical by using less emulsion.

The crust formed by the application of the emulsion stopped the wind-generated slides, but did not add any structural support to the trench wall. Although the emulsion did not supply structural support, the cohesion added to the surface of the trench wall successfully resisted minor slope failures associated with poorly consolidated sand and gravel.

Obviously many modifications and variations of the present invention are possible in light of the above teachings. It is therefore to be understood that within the scope of the appended claims the invention may be practiced otherwise than as specifically described.

What is claimed is:

1. A method of stabilizing unconsolidated sand and gravel in a geologic exploratory trench wall comprising the step of:

spraying a vinyl acetate-ethylene copolymer emulsion to the trench wall surface to form a cohesive clear emulsion-sand crust, so as to allow for visual observation of the underlying trench wall.

2. A method of stabilizing unconsolidated sand and gravel as in claim 1 wherein said vinyl acetate-ethylene copolymer emulsion is diluted with water to an emulsion concentration of from 5 to 10 percent.

3. A method of stabilizing unconsolidated sand and gravel as in claim 1 wherein said crust is 0.6 to 1.9 cm thick.

* * * * *